United States Patent [19]

Lange

[11] Patent Number: 4,624,808
[45] Date of Patent: Nov. 25, 1986

[54] FORMING A CERAMIC BY FLOCCULATION AND CENTRIFUGAL CASTING

[75] Inventor: Frederick F. Lange, Thousand Oaks, Calif.

[73] Assignee: Rockwell International Corporation, El Segundo, Calif.

[21] Appl. No.: 610,378

[22] Filed: May 15, 1984

[51] Int. Cl.$^4$ .............................................. B28B 1/20
[52] U.S. Cl. ....................................... 264/23; 264/56; 264/311; 501/1; 501/97; 501/103; 501/105
[58] Field of Search ................ 264/311, 23, 56; 501/1

[56] References Cited

U.S. PATENT DOCUMENTS

| | | | |
|---|---|---|---|
| 1,680,832 | 8/1928 | Wilder | 264/311 |
| 2,714,227 | 8/1955 | Graham et al. | 264/311 |
| 3,133,792 | 5/1964 | Jones, II | 264/311 |
| 3,497,367 | 2/1970 | Gaskin et al. | 264/311 |
| 4,316,964 | 2/1982 | Lange | 501/105 |

FOREIGN PATENT DOCUMENTS 235893  6/1960  Australia .............................. 264/311

Primary Examiner—James Derrington
Attorney, Agent, or Firm—H. Fredrick Hammann; Craig O. Malin

[57] ABSTRACT

A ceramic is fabricated by dispersing ceramic particles in a liquid, sedimenting the dispersion to remove large particles, and then changing its pH to flocculate the dispersed particles. The size distribution of the particles in each individual floc is similar to the size distribution of particles throughout the dispersion. The supernate is removed and the flocs are cast by centrifuging them into a mold. The cast flocs are dried and sintered to form the ceramic. To provide a multiphase ceramic, particles of two or more ceramics can be mixed together and flocced prior to centrifuging.

12 Claims, 5 Drawing Figures

FORMING A CERAMIC BY FLOCCULATION AND CENTRIFUGAL CASTING

BACKGROUND OF THE INVENTION

This invention relates to the field of ceramics and particularly to colloidal methods of fabricating ceramics.

In order to fabricate reliable structural ceramics, it is necessary to use processing steps which achieve both chemical and microstructural uniformity in complex sintered shapes. Inhomogeneities and nonuniformities degrade the strength of ceramics, both in the brittle regime of fracture and in the viscous flow regime at high temperatures. In particular, agglomerates must be avoided in the manufacture of structural ceramics. Their presence in powders has a number of effects, including: (a) the formation during sintering of crack-like voids which result in lower strength, (b) an increase in the temperature required to sinter to final density, (c) a reduction in the attainable endpoint density from that theoretically available, and (d) a reduction in chemical homogeneity in multiphase ceramics.

The powders used to fabricate structural ceramics contain soft agglomerates which form spontaneously in dry powder due to Van der Waal forces or residual moisture, and hard agglomerates which are collections of sintered particles formed during the calcination step of powder manufacture.

Soft agglomerates can be broken down by dispersing the powder in a liquid. Because the volume percent (v/o) of the dispersed powder in the liquid is usually less than 20 v/o, the powder should be consolidated into a non-flowable shape by raising the solid content to more than 50 v/o. The consolidated shapes are dried and then sintered to form the desired structural component. However, all current consolidation routes are limited. For example, filtration exhibits parabolic rate kinetics, thus limiting the thickness of the consolidated layer that can be built up before the colloid becomes unstable (either sediments or flocs). This problem results in a density gradient within the consolidated layer. Other routes to consolidating dispersions such as centrifuging, electrophoresis, and evaporation, either differentiate with regard to the particles' mass, or electric charge, or are also limited by kinetics.

Hard agglomerates cannot be broken up by surfacants. The manufacturers of powder attempt to break up the hard agglomerates prior to sale by attrition milling. Although milling does reduce the size of most agglomerates, large agglomerates are still present in milled powders. Additionally, milling introduces contaminants into the powder.

SUMMARY OF THE INVENTION

It is an object of the invention to provide a method of fabricating improved structural ceramics.

It is an object of the invention to provide a method of eliminating or reducing agglomerates in structural ceramics.

It is an object of the invention to provide a method of producing ceramic shapes that have a more uniform microstructure.

According to the invention, a ceramic powder is dispersed in a liquid to break down the soft agglomerates. The dispersed powder is then sedimented to remove large particles and hard agglomerates. The retained dispersion is flocced to prevent mass segregation due to sedimentation during storage and to consolidate the solids to a higher concentration. The clear supernate is removed.

If a two or more phase ceramic is being fabricated, additional dispersions of the other phases of the desired ceramic are prepared. The phases are thoroughly mixed together either before or after floccing. If the phases are flocced before mixing, then the two flocs must be mixed using a homogenizer, ultrasonic agitation or other suitable means of obtaining an intimate mixture of the flocced phases.

The flocced particles (or the mixture of flocced particles for a multiphase ceramic) are further consolidated by centrifuging. Even though the particles in the dispersion vary by size and mass, a uniform consolidation is obtained because the particles are gathered together in the form of individual flocs. Each floc has a distribution of particles which is typical of the entire dispersion, and the centrifuge consolidates the relatively uniform flocs rather that the individual particles which make up the dispersion.

The consolidated mass produced by centrifuging the flocked powders is plastic and is capable of retaining its shape under its own weight. Therefore, complex shapes such as turbine blades can be made by centrifuging the flocs into a mold.

The consolidated mass is dried and sintered to provide the structural ceramic.

These and other objects and features of the invention will be apparent from the following detailed descriptions taken with reference to the accompanying drawings.

DESCRIPTION OF THE PREFERRED EMBODIMENT

Soft agglomerates in a ceramic powder can be broken down by dispersing the powder in a liquid. At the same time, large particles such as agglomerates will settle out of the mixture by a process of sedimentation. The mixture above the sediment, or supernate, will contain particles ranging in size from the smallest particles in the powder to the larger particles which are still in the process of settling out of the mixture. These fine particles or colloids can be flocced (or agglomerated) by changing the chemistry of the liquid. During floccing, particles which were held apart by repulsive, interparticle forces, are attracted to one another to form flocs. These flocs are a collection of many particles of various sizes from the supernate.

During work leading to the invention, it was discovered that the average mass of particles within individual flocs reflected the average mass distribution of the particles in the dispersed state. Further, if the flocced state is centrifuged, the centrifugal force acts on the collective mass of the flocced particles instead of acting separately on the masses of the individual particles within the flocs. That is, the flocs are centrifuged instead of the individual particles. Consequently, centrifuging the flocced state of the colloid provides a consolidated body without any differentiation of particle mass, whereas centrifuging the dispersed state causes the more massive particles to segregate at the bottom.

The invention utilizes the discovery to provide ceramics with a more uniform microstructure by floccing a dispersion of ceramic particles and then consolidating the flocced particles by centrifuging. Examples of methods used to illustrate the invention are presented below.

EXAMPLE 1

Figure 1:
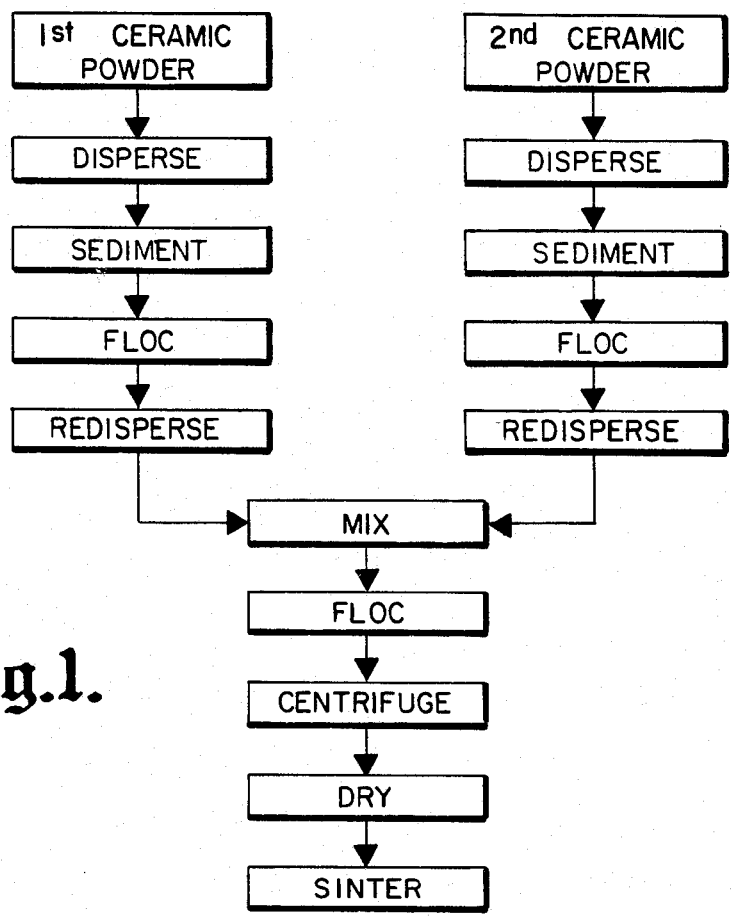
FIG. 1 is a flow chart illustrating a process for fabricating a multiphase ceramic according to a preferred embodiment of the invention.
Figure 2:
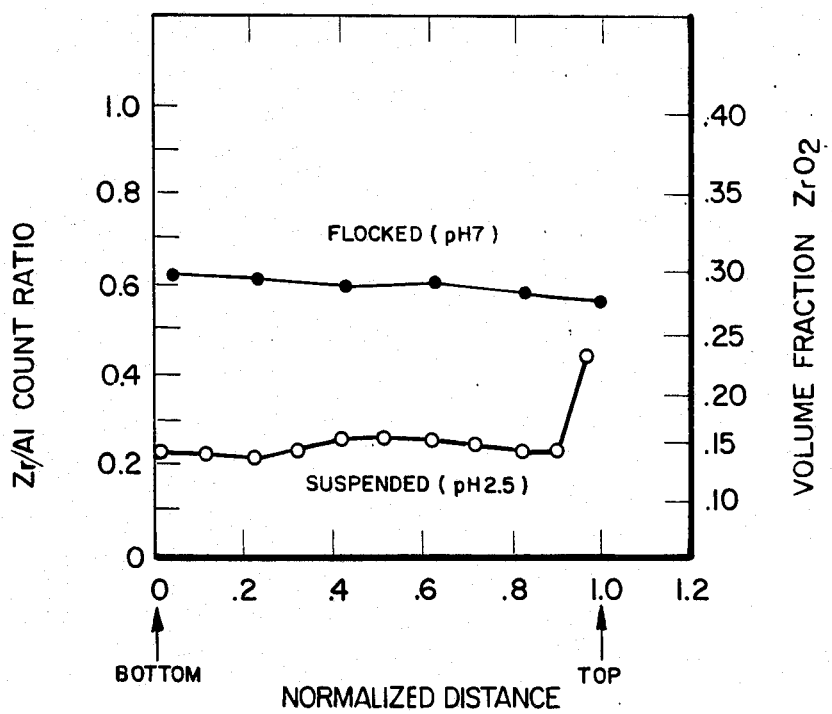
FIG. 2 is a graph showing the uniformity in composition and microstructure obtained from a two-phase ceramic when processed by floccing (per FIG. 1) as compared to processing without floccing.

$Al_2O_3 + 30$ v/o $ZrO_2$—FIGS. 1 AND 2

To show the improved uniformity obtained by the invention, a two phase mixture of $Al_2O_3$ (density=3.98 gm/cc) and $ZrO_2$ (density=6.05 gm/cc) was centrifuged in both its unflocced (dispersed) state and in its flocced state. After drying, both consolidated specimens were sintered and examined to determine the uniformity of the microstructure produced by the two different methods.

Both the $Al_2O_3$ and $ZrO_2$ powders were first dispersed separately in water at pH=2.5 (using HCl for pH adjustment) and sedimented to obtain a dispersion of particles which did not exceed 1 micron. Particle size distribution studies showed that the sedimented $ZrO_2$ powder contained a much higher percentage of smaller particles relative to the $Al_2O_3$ powder. After several sedimentations, the 1 micron or less dispersions were flocced by increasing the pH to 7 (using $NH_4OH$). After sedimentation of the flocced states, the clear supernates were poured off. This procedure increased the volume % (v/o) of the solids from about 1-2 v/o in the dispersed states (pH=2.5) to 19 v/o for the flocced $Al_2O_3$ state and 5 v/o for the flocced $ZrO_2$ state. The texture of both flocced states appeared similar to that of latex paint.

A 30 v/o $ZrO_2$-70 v/o $Al_2O_3$ mixture was prepared by weighing proper proportions of each flocked phase and then redispersing each phase by adjusting the pH to 2.5. This pH adjustment helped insure the dispersion of the two phases when they were mixed and passed through a small chamber containing a horn vibrating at ultrasonic frequencies.

One half of the fluid $Al_2O_3/ZrO_2$ dispersion was placed into one centrifuge tube, and the other half was flocced by changing the pH to 7 before it was also placed into a second centrifuge tube. Both tubes were centrifuged together at an angular velocity to achieve approximately 2000 times the force of gravity for 10 minutes.

After centrifuging, the tubes were removed and examined. Although both tubes contained a consolidated sediment, the supernate in the tube which contained the unflocced mixture (pH=2.5) was cloudy compared to the clear supernate in the tube which contained the flocced mixture (pH=7). An X-ray diffraction analysis of the solids in the cloudy supernate indicated a much greater v/o (over 80 v/o) of the $ZrO_2$ phase relative to the initial mixture (30 v/o $ZrO_2$). Because the mass distribution of the $ZrO_2$ powder particles was smaller than that for the $Al_2O_3$ powder particles, mass segregation occurred during centrifuging of the unflocced two-phase mixture.

The supernates were poured off prior to removing the consolidated particles from the bottom of each tube. The material resulting from the flocced mixture had the appearance of a solid body and retained its shape after removal. However, the material resulting from the unflocced mixture was semi-fluid and slumped to some extent upon sitting. Both were air dried prior to sintering at 1600 degrees C for 1 hour. Both achieved a sintering density of over 98 percent of theoretical.

FIG. 1 is a flow chart showing the processing of the flocced sample. Processing of the unflocced sample was the same except that it was not flocced after mixing prior to centrifuging. The floccing done on both samples immediately after sedimentation was done to permit storage of the material without incurring additional sedimentation during storage.

After sintering, each specimen was sectioned parallel to the centrifugal force direction with a diamond saw and polished. Both were coated with carbon and viewed in a scanning electron microscope to observe the size of each phase and to determine the $ZrO/Al_2O_3$ phase ratio (using the Zr/Al X-ray count ratio) from the bottom to the top of the specimen. This distance, taken parallel to the centrifuging direction, was approximately 1 cm for both specimens.

FIG. 2 illustrates the Zr/Al count ratio vs. the normalized distance from the specimen's bottom to its top. As shown in the top curve, this ratio was nearly constant across the specimen obtained from the mixture which was flocced according to the invention. The ratio also correlates to that expected for an $Al_2O_3$ multiphase ceramic containing 30 v/o $ZrO_2$. For the comparison specimen fabricated from the unflocced mixture, the results were different as shown in the lower curve marked "suspended". For the unflocced specimen, the Zr/Al count ratio was nearly constant along the lower 90 v/o of the specimen's thickness, but it increased markedly near the top of the specimen. Additionally, the average Zr/Al count ratio corresponds to only 14 v/o $ZrO_2$. Both these results and the observed concentration of $ZrO_2$ in the supernate show that the smaller $ZrO_2$ paricles were differentiated from the larger $Al_2O_3$ particles when the unflocced mixture was centrifuged.

Micrographs prepared of the two specimens also confirmed the above results. The grain size of the flocced and centrifuged specimen was uniform throughout its thickness, whereas the grain size of the unflocced specimen increased greatly near the bottom.

EXAMPLE 2

Figure 3:
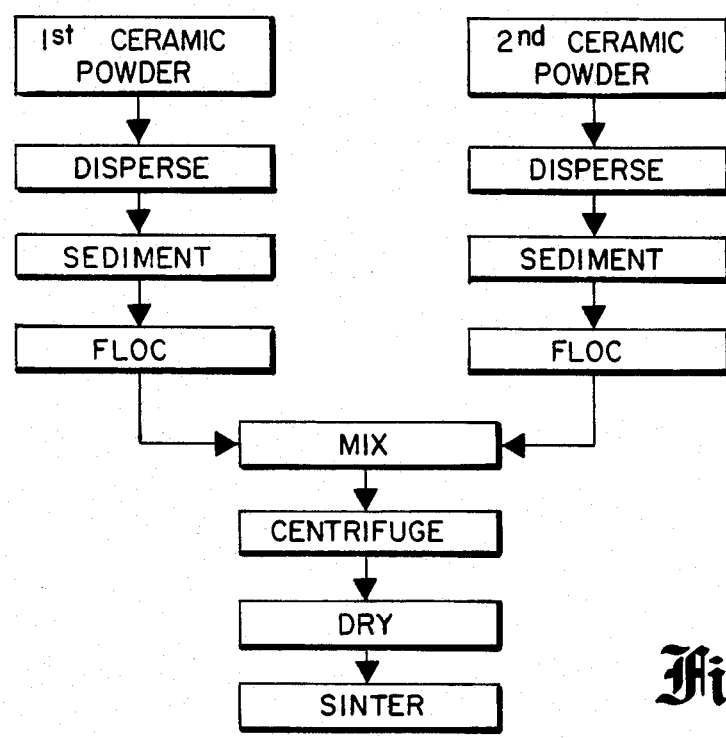
FIG. 3 is a flow chart illustrating an embodiment of the invention in which the two sediments are flocced before mixing.

$Al_2O_3 + 5$ v/o $ZrO_2$—FIG. 3 (HOMOGENIZATION)

$Al_2O_3$ powder (#A16SG from ALCOA) and $ZrO_2$ power (from Zircar) were separately mixed with distilled water to achieve a solid concentration of 2 to 3 v/o. HCl was used to adjust the pH of both mixtures to 2 in order to provide the dispersed state. After achieving a stable dispersion, the dispersed powders were sedimented to remove all particles and hard agglomerates greater than about 1 micron.

Retained dispersions containing particles or agglomerates less than 1 micron were immediately flocced to prevent mass segregation due to sedimentation during storage and to consolidate the solids to a higher concentration. Floccing was accomplished by using NH4OH to change the pH of the Al2O3 dispersion to 8.5 and the pH of the ZrO2 dispersion to 7.5.

After floccing, the clear supernate was removed leaving flocced suspensions which had the appearance of latex paint. The density of the flocced Al2O3 and ZrO2 suspensions were 1.36 gm/cm$^3$ and 1.53 gm/cm$^3$, respectively. The volume fraction of solids for the Al2O3 and ZrO2 suspensions were 0.12 and 0.11, respectively.

The flocced suspensions were then mixed together in the proportion of 95 v/o Al2O3 and 5 v/o ZrO2. This was accomplished by placing the suspensions in a container and handshaking the container vigorously for 2 minutes. The handshaked mixture was then mixed in a homogenizer. The homogenizer uses a high-speed motor to drive a straight edged rotor at 20,000 rpm within a slotted, open chamber. Mixing with the homogenizer for just 15 seconds produced no inhomogenics larger than 2 microns. This means that the large droplet-like flocs produced by handshaking were satisfactorily broken down after only 15 seconds of mixing with the homogenizer. Mixing for 60 and 120 seconds produced the same results.

Because the mixed suspension was still in the flocced state, it could be centrifuged directly after mixing as shown in the FIG. 3 flow chart. The centrifuged material could then be dried and sintered as described in Example 1 to produce a uniform distribution of the two phases in the ceramic.

EXAMPLE 3

Al2O3+5 v/o ZrO2—FIG. 3 (ULTRASONIC AGITATION)

Flocced Al2O3 and ZrO2 suspensions were prepared and mixed by handshaking as described in Example 2. Further mixing was then accomplished using a 150 watt ultrasonic agitator rather than an emulsifier. The ultrasonic agitator transmits sonic waves at 20,000 Hz through an acoustic horn. When the horn is immersed into a fluid, it creates a region of high agitation. Mixing with the ultrasonic horn for a period of 15 seconds produced satisfactory mixing of the two flocs. However, mixing for periods of 60 and 120 seconds resulted in apparent resegregation as evidenced by 5-10 micron clusters of ZrO2 particles.

The flocs which were mixed with the ultrasonic agitator for 15 seconds were suitable for centrifuging, drying, and sintering as described in Example 1 to produce a ceramic with uniform microstructure.

EXAMPLE 4

Si3N4+5 v/o ZrO2—FIG. 3 (HOMOGENIZATION)

A mixture of flocced Si3N4 and ZrO2 was prepared as described in Example 2 except that Si3N4 powder was used rather than Al2O3 powder. The Si3N4 powder was obtained from H. C. Stark of West Germany and was identified as LC 12. It was dispersed at a pH of 10 and was flocced at a pH of 7.4. The flocced suspension had a density of 1.22 gm/cm$^3$ and a volume fraction of solids of 0.10.

Homogenization of the Si3N4 and ZrO2 flocs produced a mixture which was suitable for centrifuging, drying, and sintering to produce a ceramic with uniform microstructure.

EXAMPLE 5

Si3N4+5 v/o ZrO2—FIG. 3 (ULTRASONIC AGITATION)

A mixture of flocced Si3N4 and ZrO2 was prepared as described in Example 4 except that mixing was done using ultrasonic agitations as described in Example 3.

The flocs which were mixed with the ultrasonic agitator for 15 seconds were suitable for centrifuging, drying, sintering to produce a ceramic with uniform microstructure.

EXAMPLE 6

2-PHASE CERAMIC—FIG. 4

Figures 4, 5:
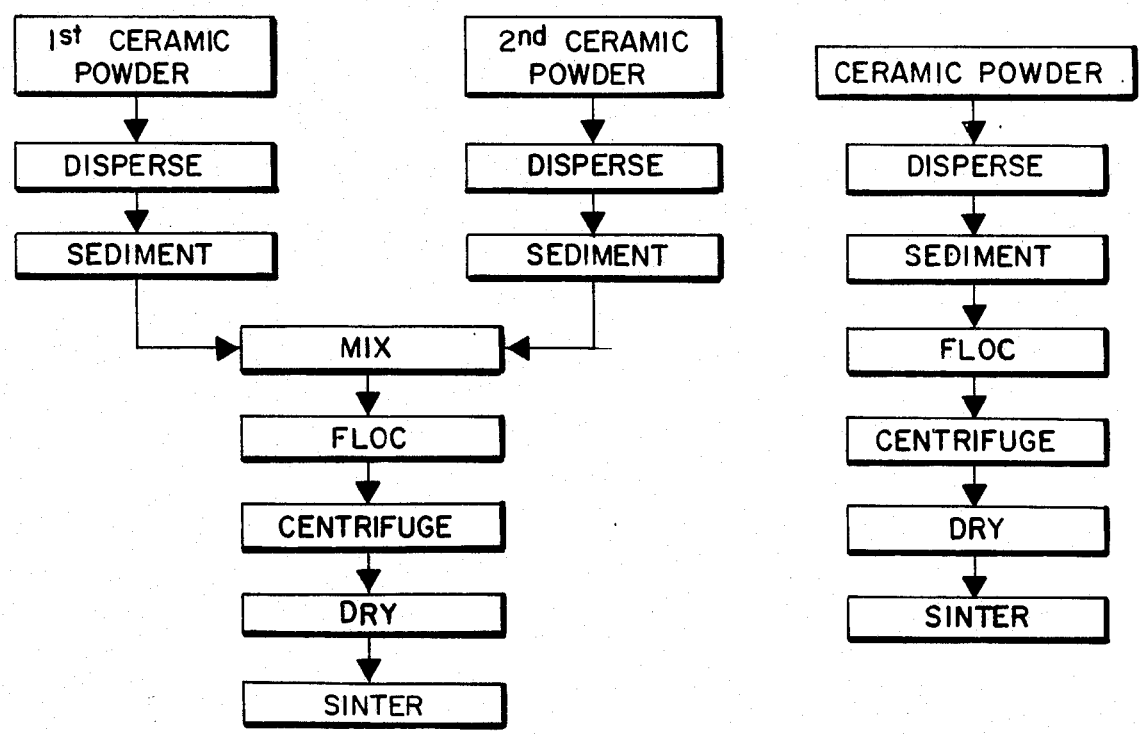
FIG. 4 is a flow chart illustrating an embodiment of the invention in which the two sediments are mixed before floccing.
FIG. 5 is a flow chart illustrating an embodiment of the invention in which a single-phase ceramic is fabricated.

FIG. 4 is a flow chart showing a method for producing a 2-phase ceramic. The process is similar to the processes described in Examples 1-5 except that the dispersed powders are not flocced immediately after sedimentation as shown in FIGS. 1 and 3. Rather, the dispersed powders are mixed while still in the dispersed state and then flocced prior to centrifuging. Mixing in the dispersed state can be accomplished by shaking and doesn't require elaborate mixing methods such as homogenization or ultrasonic agitation.

EXAMPLE 7

1-PHASE CERAMIC—FIG. 5

FIG. 5 is a flow chart showing a method for producing a single-phase ceramic. The process is similar to the process described for Examples 1-5 except that mixing is not required because only a single ceramic powder is used.

The process illustrated by the above examples provides a ceramic with a uniform microstructure. In addition to this important feature, the invention provides other advantages. For example, the consolidated mass produced by flocced centrifugal casting is plastic. That is, the mass retains its shape under its own weight. This is significant because complex shapes such as turbine blades can be made by this process. The flocced material can be centrifuged into a mold, and casting techniques such as split molds, wax molds, or soluble molds can be used to shape the material during centrifuging while permitting removal of the shaped plastic mass after centrifuging.

Another advantage of the process is the high green density of the consolidated mass after centrifuging and drying. For a given particle size distribution, the higher the green density, the lower the temperature required for sintering. Experiments have shown that when the flocced ceramic powder is centrifuged as described in the above examples, a green density of 50% of theoretical density is achieved.

Numerous variations can be made without departing from the invention. For example, flocculation can be induced by methods other than a change in pH. The water could be replaced with an organic fluid such as acetone to induce spontaneous flocculation. Accordingly, it should be understood that the form of the invention described above is illustrative and is not intended to limit the scope of the invention.

What is claimed is:

1. A method of fabricating a structural ceramic comprising the steps of:
   dispersing ceramic particles in a liquid;

sedimenting the disposed particles to remove large particles and agglomerates;

flocculating the dispersed ceramic particles;

removing the clear supernate from the flocced ceramic particles;

centrifuging said flocced ceramic particles to produce a consolidated mass capable of retaining its shape; and sintering the centrifuged ceramic particles.

2. The method as claimed in claim 1 wherein said step of centrifuging comprises centrifugally casting said flocced ceramic particles into a mold.

3. The method as claimed in claim 1 including the step of air drying said centrifuged ceramic particles prior to sintering.

4. The method as claimed in claim 1 wherein said step of flocculating comprises changing the pH of said liquid.

5. A method of fabricating a structural ceramic comprising the steps of:

dispersing ceramic particles in a liquid;

sedimenting said dispersed particles to remove large particles and agglomerates;

flocculating said dispersed particles by changing the pH of said liquid;

removing supernate from said flocced particles;

centrifugally casting said flocced particles into a mold to produce a consolidated mass capable of retaining its shape;

drying said cast particles; and sintering said dried particles.

6. A method of fabricating a multiphase structural ceramic comprising the steps of:

dispersing particles of a first ceramic in a first liquid;

sedimenting said dispersed particles of a first ceramic to remove large particles and agglomerates;

flocculating the dispersed particles of said first ceramic;

dispersing particles of a second ceramic in a second liquid;

sedimenting said dispersed particles of a second ceramic to remove large particles and agglomerates;

flocculating the dispersed particles of said second ceramic;

removing clear supernate and mixing the flocced particles of said first and said second ceramics;

centrifuging the mixture of said first and said second ceramics to produce a consolidated mass capable of retaining its shape; and sintering the centrifuged mixture.

7. The method as claimed in claim 6 wherein said step of mixing comprises shaking the flocced particles of said first and said second ceramics together and then feeding the mixture into an homogenizer.

8. The method as claimed in claim 6 wherein said step of mixing comprises shaking the flocced particles of said first and said second ceramics together and then exposing the mixture to ultrasonic agitation.

9. The method as claimed in claim 6 including the step of air drying said centrifuged mixture prior to sintering.

10. A method of fabricating a multiphase structural ceramic comprising the steps of:

dispersing particles of a first ceramic in a first liquid;

sedimenting said dispersed particles of a first ceramic to remove large particles and agglomerates;

dispersing particles of a second ceramic in a second liquid;

sedimenting said dispersed particles of a second ceramic to remove large particles and agglomerates;

mixing the dispersed particles of said first and second ceramics;

flocculating the particles of said first and second ceramics;

removing clear supernate from said flocced particles;

centrifuging the flocced particles of said first and second ceramics to produce a consolidated mass capable of retaining its shape; and sintering the centrifuged particles of said first and second ceramics.

11. The method as claimed in claim 10 including the steps of:

flocculating the dispersed particles of said first ceramic and then redispersing them prior to said mixing step; and flocculating the dispersed particles of said second ceramic and then redispersing them prior to said mixing step.

12. The method as claimed in claim 10 including the step of drying said centrifuged particles prior to said sintering step.

* * * * *